US009674746B2

(12) United States Patent
Sintorn et al.

(10) Patent No.: US 9,674,746 B2
(45) Date of Patent: Jun. 6, 2017

(54) APPLICATION SERVICE PLATFORM WITH ACCESS TO CONTEXT DATA OF REMOTE ACCESS NODE

(71) Applicant: Telefonaktiebolaget L M Ericsson (publ), Stockholm (SE)

(72) Inventors: Mathias Sintorn, Sollentuna (SE); Per Synnergren, Gammelstad (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/413,059

(22) PCT Filed: Oct. 15, 2012

(86) PCT No.: PCT/EP2012/070398
§ 371 (c)(1),
(2) Date: Jan. 6, 2015

(87) PCT Pub. No.: WO2014/008957
PCT Pub. Date: Jan. 16, 2014

(65) Prior Publication Data
US 2015/0172436 A1  Jun. 18, 2015

Related U.S. Application Data

(60) Provisional application No. 61/669,750, filed on Jul. 10, 2012.

(51) Int. Cl.
*H04W 36/00* (2009.01)
*H04M 1/725* (2006.01)
(Continued)

(52) U.S. Cl.
CPC ......... *H04W 36/12* (2013.01); *H04L 12/4633* (2013.01); *H04L 67/10* (2013.01);
(Continued)

(58) Field of Classification Search
None
See application file for complete search history.

(56) References Cited

U.S. PATENT DOCUMENTS 8,125,939 B2 * 2/2012 Murasawa ............ H04L 63/029
370/274
8,514,756 B1 * 8/2013 Ramachandra ..... H04L 61/2069
370/310
(Continued)

FOREIGN PATENT DOCUMENTS

EP  1701516 A1  9/2006
EP  1708423 A1  10/2006
(Continued)

OTHER PUBLICATIONS

3GPP, "3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 11)", 3GPP TS 48.018 V11.0.0, Sep. 2012, 1-185.
(Continued)

*Primary Examiner* — Eunsook Choi
(74) *Attorney, Agent, or Firm* — Murphy, Bilak & Homiller, PLLC

(57) ABSTRACT

For providing one or more application services in a telecommunications network, an application service platform (150A) is provided at an access node (1 1 OA) of the telecommunications network. Via the access node (1 1 OA), a UE (10) can access the telecommunications network. Further, the UE (10) may access the telecommunications network via a further access node (1 10B). The application services are accessible to the UE (10) via the access node (1 1 OA) or via the further access node (1 1 OB). If the UE (10) is connected to the telecommunications network via the further access node (1 10B), the AS platform (150A) at the
(Continued)

access node (1 10A) obtains context data of the UE (10) from the further access node (1 10B).

17 Claims, 10 Drawing Sheets

(51) Int. Cl.
*H04W 36/12* (2009.01)
*H04W 4/20* (2009.01)
*H04W 88/08* (2009.01)
*H04W 4/00* (2009.01)
*H04L 12/46* (2006.01)
*H04L 29/08* (2006.01)
*H04W 36/18* (2009.01)
*H04W 88/16* (2009.01)

(52) U.S. Cl.
CPC ....... *H04M 1/72522* (2013.01); *H04W 4/003* (2013.01); *H04W 4/20* (2013.01); *H04W 36/0033* (2013.01); *H04W 36/0044* (2013.01); *H04W 36/18* (2013.01); *H04W 88/08* (2013.01); *H04W 88/16* (2013.01)

(56) References Cited

U.S. PATENT DOCUMENTS

| | | | |
|---|---|---|---|
| 8,848,610 B2* | 9/2014 | Miklos | ............ 370/328 |
| 9,198,032 B2* | 11/2015 | Serravalle | ............ H04W 8/26 |
| 2003/0204599 A1 | 10/2003 | Trossen et al. | |
| 2003/0212764 A1 | 11/2003 | Trossen et al. | |
| 2006/0056351 A1 | 3/2006 | Wall | |
| 2008/0225798 A1 | 9/2008 | Trossen | |
| 2010/0020709 A1* | 1/2010 | Ohm | ............ H04B 7/0417 370/252 |
| 2010/0061301 A1* | 3/2010 | Antal | ............ H04L 45/00 370/328 |
| 2010/0208653 A1* | 8/2010 | Morinaga | ............ H04W 28/08 370/328 |
| 2013/0090087 A1 | 4/2013 | Kroeselberg et al. | |
| 2013/0260810 A1* | 10/2013 | Rayavarapu | ........ H04W 76/028 455/509 |
| 2013/0287012 A1* | 10/2013 | Pragada | ............. H04W 76/045 370/338 |

FOREIGN PATENT DOCUMENTS

| | | |
|---|---|---|
| EP | 2007098 A1 | 12/2008 |
| EP | 2403186 A1 | 1/2012 |
| WO | 0106732 A1 | 1/2001 |
| WO | 2011116821 A1 | 9/2011 |
| WO | 2014008955 A1 | 1/2014 |
| WO | 2014008956 A1 | 1/2014 |

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.1.0, Sep. 2012, 1-262.

3GPP, "3rd Generation Partnership Project; Technical Specification Group Radio Access Network; UTRAN Iu interface Radio Access Network Application Part (RANAP) signalling (Release 11)", 3GPP TS 25.413 V11.1.0, Sep. 2012, 1-430.

3GPP, "3rd Generation Partnership Project; Technical Specification Group Services and System Aspects; IP Multimedia Subsystem (IMS) Service Continuity; Stage 2 (Release 12)", 3GPP TS 23.237 V12.0.0, Jun. 2012, 1-167.

3GPP, "3rd Generation Partnership Project; Technical Specification Group Services and System Aspects; IP Multimedia Subsystem (IMS); Stage 2 (Release 11)", 3GPP TS 23.228 V11.5.0, Jun. 2012, 1-288.

* cited by examiner

APPLICATION SERVICE PLATFORM WITH ACCESS TO CONTEXT DATA OF REMOTE ACCESS NODE

TECHNICAL FIELD

The present invention relates to methods for providing an application service in a telecommunications network and to corresponding devices.

BACKGROUND

In telecommunications networks, e.g., as specified by 3GPP ($3^{rd}$ Generation Partnership Project), it is known to provide application services to users of the telecommunications network. Examples of such application services are Internet Protocol (IP) based multimedia services. One possibility is to provide the application services by application servers in a core network of the telecommunications network. A further possibility is to add an application service (AS) platform at nodes of an access network of the telecommunications network. Examples of such access nodes are nodes of a Radio Access Network (RAN) of a cellular mobile telecommunications system, such as a Radio Network Controller (RNC) of the UMTS (Universal Mobile Telecommunications System) Terrestrial Radio Access Network (UTRAN) or a base station of the evolved UTRAN (E-UTRAN) according to 3GPP LTE (Long Term Evolution), referred to as E-UTRAN Node B (eNB). Such AS platform may be implemented as an open computing platform which can host applications provided by the operator of the telecommunications network and also applications provided by other parties.

In a typical scenario, a user equipment (UE) connected to the telecommunications network via a given access node would access an application running on the AS platform at this access node. The AS platform could then expose useful information available at the access node to the application, e.g., information on radio channel characteristics, UE identifiers, or the like.

However, due to mobility of the UE it may also occur that the access node which is used by the UE for connecting to the telecommunications network changes, resulting in a scenario in which the application is running on the AS platform at one access node, but the UE uses another access node for connecting to the telecommunications network. It may then no longer be possible to provide the AS platform with useful information available at the access node used for connecting to the telecommunications network.

Accordingly, there is a need for techniques which allow for efficiently addressing such scenarios and providing an AS platform at an access node with valuable information even if another access node is used for connecting to the telecommunications network.

SUMMARY

According to an embodiment of the invention, a method of providing an application service in a telecommunications network is provided. The telecommunications network is accessible to a UE via an access node or via a further access node. According to the method, an AS platform is provided at the access node. Via the AS platform at the access node, one or more application services are provided to the UE. The application services are accessible to the UE via the access node or via the further access node. If the UE is connected to the telecommunications network via the further access node, the AS platform at the access node obtains context data of the UE from the further access node.

According to a further embodiment of the invention, a network node is provided. The network node comprises an access node for providing access of a UE to a telecommunications network. Further, the network node comprises an AS platform for supporting one or more application services which are accessible to the UE via the access node or via a further access node of the telecommunications network. The AS platform is configured to obtain, if the UE is connected to the telecommunications network via the further access node, context data of the UE from the further access node.

According to a further embodiment of the invention, a network system is provided. The network system comprises an access node and a further access node for providing access of a UE to a telecommunications network. Further, the network system comprises an AS platform at the access node for supporting one or more application services which are accessible to the UE via the access node or via the further access node. The AS platform at the access node is configured to obtain, if the UE is connected to the telecommunications network via the further access node, context data of the UE from the further access node. The further access node is configured to provide the context data to the AS platform at the access node.

According to a further embodiment of the invention, a computer program product is provided. The computer program product comprises program code to be executed by a processor of a network node, thereby configuring the network node to operate in accordance with the above method.

DETAILED DESCRIPTION OF EMBODIMENTS

In the following, the invention will be explained in more detail by referring to exemplary embodiments and to the accompanying drawings. The illustrated embodiments relate to concepts of providing an application service in a telecommunications network. In the illustrated embodiments, the telecommunications network implements a 3GPP cellular radio access technology. However, it is to be understood that these concepts could also be implemented in other types of telecommunications network.

Figure 1:
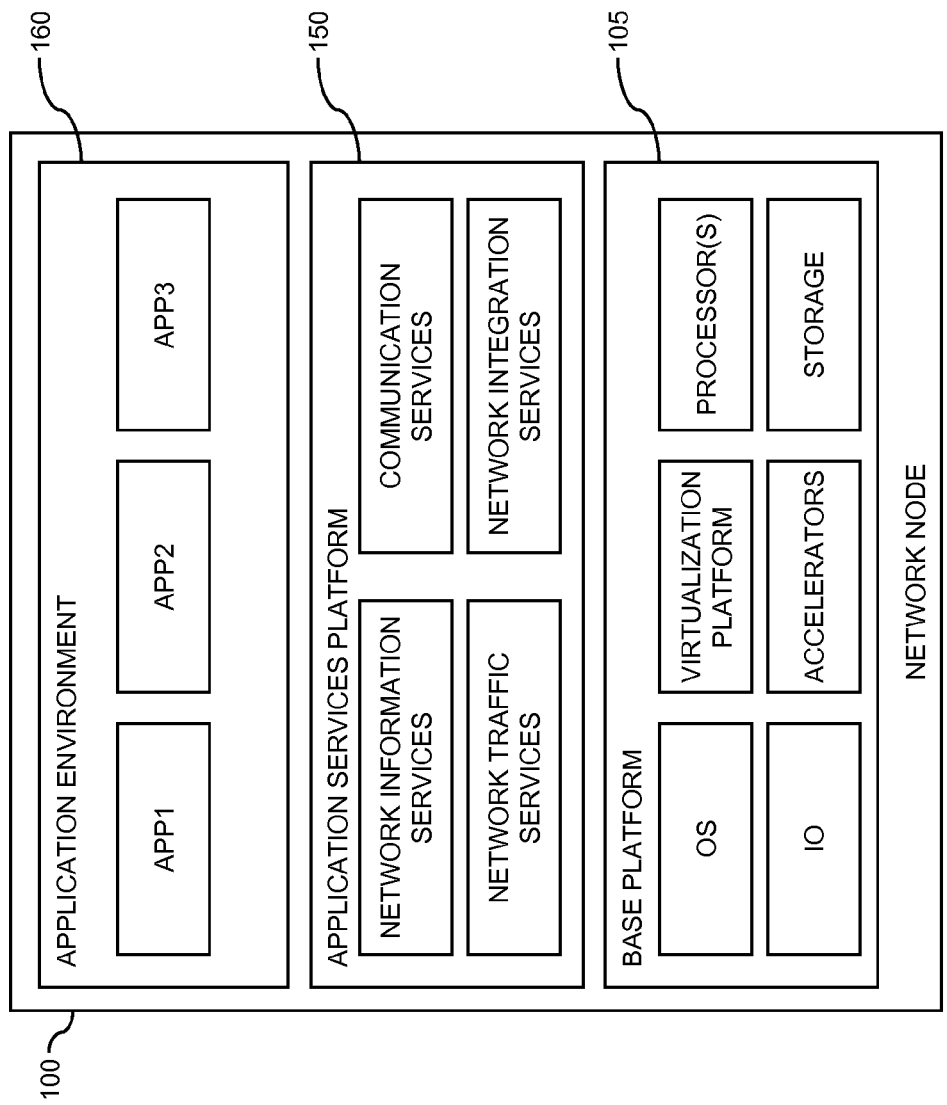
FIG. 1 schematically illustrates a network node according to an embodiment of the invention.

FIG. 1 schematically illustrates a network node 100 according to an embodiment of the invention. As further explained below, the network node 100 may be a node of a RAN of the telecommunications network. In particular, the node may implement an access node in the form of a base station, e.g., an eNB, or a controller of a base station, e.g., an RNC. In the illustrated example, the network node 100 is provided with a base platform 105. The base platform 105 comprises hardware and software structures as required for implementing typical functionalities of the access node. As illustrated in FIG. 1, such hardware structures may include one or more processors, e.g., in the form of a Central Processing Unit and/or a set of special purpose processors. Further, such hardware structures may include a storage, e.g., in the form of a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The storage may store program code to be executed by the processor(s), e.g., for implementing the software structures, and/or other data. Still further, such hardware structures may include one or more accelerators, e.g., for supporting certain computation tasks such as coding or decoding, and Input/Output (IO) device(s), e.g., interfaces, receivers, or transmitters. The software structures may include an operating system (OS). Further, the base platform 105 may include a virtualization platform which may be implemented by software structures, but may also be supported by hardware structures.

In addition, the network node 100 includes an AS platform 150 for providing one or more application services to one or more UEs connected to the telecommunications network. The AS platform 150 may be implemented by software structures utilizing hardware and/or software structures of the base platform 105. The AS platform 150 in turn may support an application environment 160 for hosting one or more applications (in the illustrated example shown as APP1, APP2, APP3). Each application may be designed for providing a corresponding application service to the UEs. The applications may be provided by the operator of the telecommunications network and/or by some other party. The AS platform 150 may also connect to other network nodes or external nodes, e.g., for network management and control.

As can be seen, the AS platform 150 is integrated in the network node 100 to provide application services at the network node 100. In this way, network and/or processing load for providing the application services may be efficiently distributed in the telecommunications network.

The AS platform 150 may be regarded as a middleware between the base platform 105 and the applications running in the application environment. The AS platform 150 may provide functionalities such as basic communication methods and control mechanisms, e.g., allowing the application services to communicate with each other, with other external applications, and/or with other functionalities implemented by the hardware and/or software structures of the network node 100. In the example of FIG. 1, the functionalities provided by the AS platform 150 are referred to as network information services (NIS), network traffic services, network integration services, and communication services. The network traffic services functionality may for example provide routing and priority of UE traffic streams between the access node and one or more applications running on the AS platform 150, or between the access node and Internet. The network integration services may provide interfaces to existing CN functionality relating to, e.g., policy control, charging and lawful/legal interception. Network traffic services and network integration services may be provided for example by functionalities which are similar to those as typically implemented by a user plane gateway. The communication services may provide functionalities used for communications between applications running on the AS platform 150 and other of the functionalities of the AS platform 150.

The functionality referred to as NIS has the purpose of exposing information about the network node 100 and its connected UEs to the applications running in the application environment 160. The information about the network node 100 may for example include a number of connected UEs, e.g., as identified by a Radio Resource Control (RRC) functionality of the network node 100, an average of transmit powers controlled by the network node 100, an average throughput of a cell controlled by the network node 100, an average delay of packets buffered by the network node 100, an average High Speed (HS) code utilization (e.g. average utilization of High Speed Packet Access (HSPA) channelization codes), or the like. Such information about a UE may include an identifier of the UE, e.g., an International Mobile Subscriber Identity (IMSI) associated with the UE, a Mobile Station International Subscriber Directory Number (MSISDN) associated with the UE, a Temporary Mobile Subscriber Identity (TMSI) associated with the UE, a Global Unique Temporary Identity (GUTI) of the UE, an International Mobile Equipment Identity (IMEI) of the UE, or a Radio Network Temporary Identity (RNTI) assigned to the UE. Further, such information about a UE may include radio channel information such as a RRC State indication for the UE, a serving cell Reference Signal Received Power (RSRP) or signal to noise and/or interference measure like Ec/No (Chip energy to Noise spectral density) ratio measured by the UE, a Channel Quality Indicator (CQI) determined by the UE, a transmit power of the UE, or the like. The information may be divided into RAN information as typically available at an access node, e.g., an eNB or an RNC, and core network (CN) information as typically available at CN nodes of the telecommunications network, e.g., at a gateway node. The RAN information may include the GUTI, TMSI, RNTI, RRC state indication, serving cell RSRP or Ec/No ratio, transmit powers, average transmit powers, CQI, cell throughput, or the like. The CN information may include the IMSI, IMEI, MSISDN, UE IP address, or the like.

The NIS functionality may aggregate such information and make the information available to the applications running in the application environment, e.g., through an Application Programming Interface to facilitate usage of the information by applications from various parties. Such API could also be provided by a specific API aggregation application running in the application environment.

One example of the above applications that may be realized on the basis of the AS platform 150 and utilizes the information provided by the network information services functionality is a Transport Control Protocol (TCP) proxy that changes the TCP congestion window as a function of the radio network information it gets via the NIS functionality (or via an API aggregation application).

Figure 2:
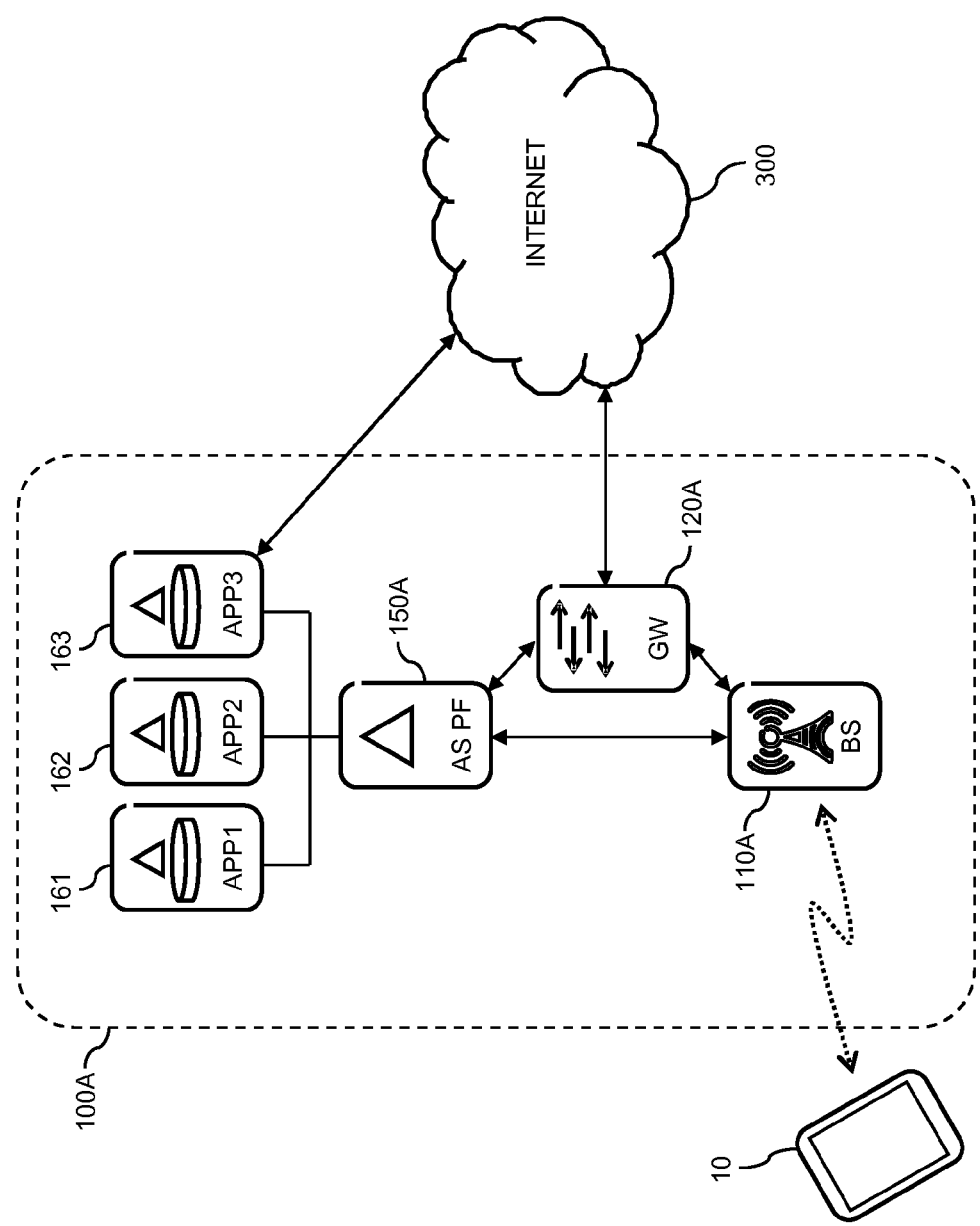
FIG. 2 schematically illustrates an implementation in which an AS platform is provided at a base station of a mobile telecommunications network.

An exemplary implementation of the AS platform at a 3GPP LTE base station (BS), i.e., an eNB, is further illustrated in FIG. 2. In this implementation, a network node 100A includes the BS 110A and the AS platform (AS PF) 150A. By way of example, applications 161, 162, 163 are illustrated as being implemented on the basis of the AS platform 150A. Further, the network node 100A also includes a gateway node (GW) 120A for carrying user plane data between the UE 10 and the Internet 300. In accordance with the illustrated LTE scenario, the gateway node 120A may implement a Serving Gateway (SGW) and/or Packet Data Network Gateway (PGW). The network node 100A may be implemented on the basis of a common base platform 105 as illustrated in FIG. 1 and/or on the basis of multiple co-located devices.

For example, a device implementing the BS 110A and the AS platform 150A could be co-located with a further device implementing the gateway node 120A, or a device implementing the BS 110A could be co-located with a further device implementing the gateway node 120A and the AS platform 150A. In the following, co-location of certain nodes is considered to cover both implementation of the nodes in the same device, e.g., on the basis of a common base platform as illustrated in FIG. 1, and implementation of the nodes in different but co-located devices.

In the implementation of FIG. 2, co-locating the gateway node 120A with the BS 110A and the AS platform 150A allows for efficiently using the gateway node 120A as a decision point for selectively directing user plane data of the UE 10 to the AS platform 150A or to the Internet 300. Further, mechanisms of the gateway node 120A can be utilized for applying charging, policy enforcement, and/or lawful interception also to the user plane data between the UE 10 and the AS service platform 150A.

Figure 3:
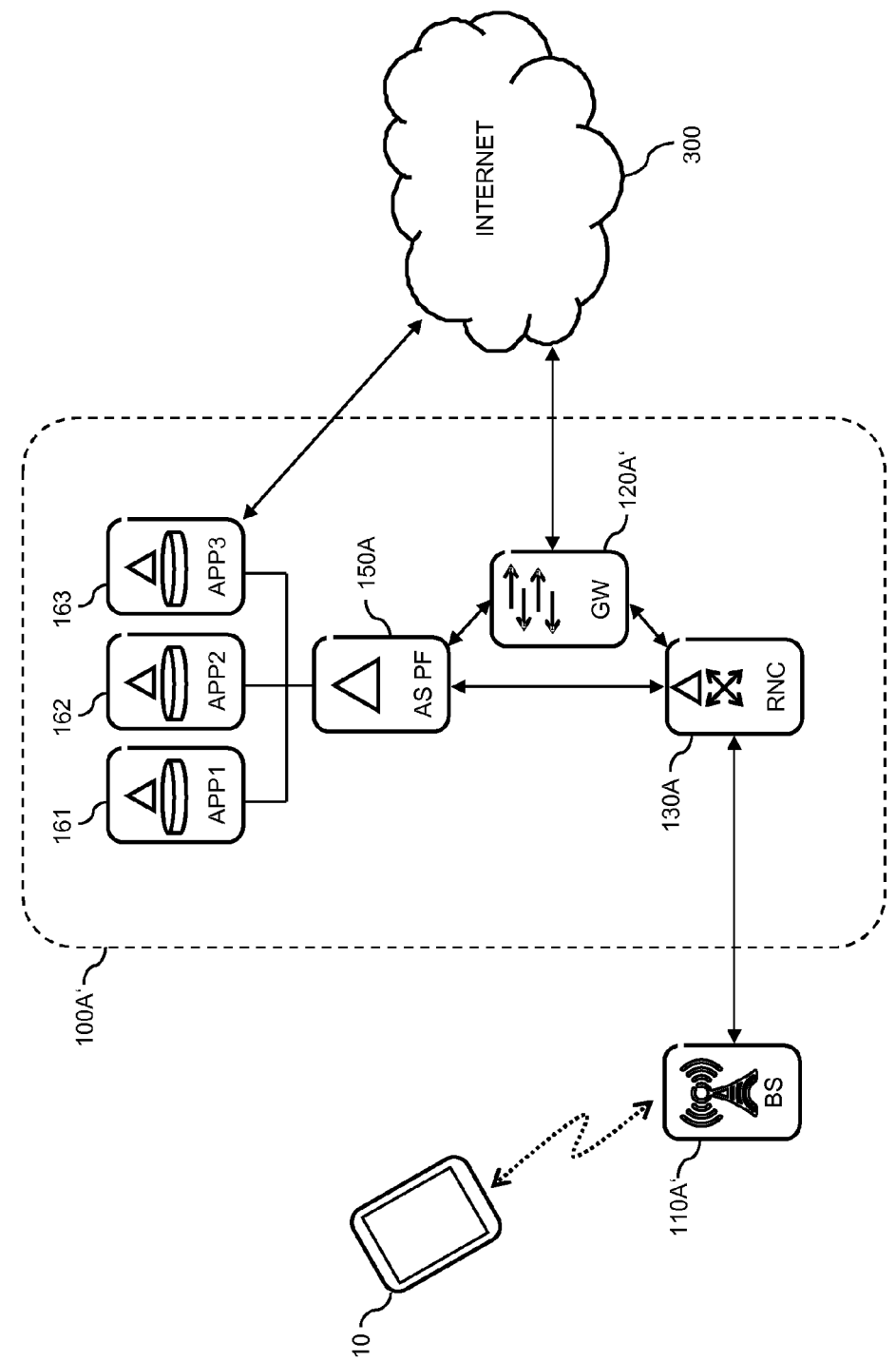
FIG. 3 schematically illustrates an implementation in which an AS platform is provided at a controller of a base station of a mobile telecommunications network.

FIG. 3 illustrates an exemplary implementation of the AS platform at a radio network controller (RNC), e.g., at an RNC in a UTRAN or a Base Station Controller (BSC) in a Global System for Mobile Communications Radio Access Network (GERAN) supporting General Packet Radio Service (GPRS). In this implementation, a network node 100A' includes the RNC 130A and the AS platform 150A. By way of example, applications 161, 162, 163 are illustrated as being implemented on the basis of the AS platform 150A. Further, the network node 100A' also includes a gateway node (GW) 120A' for carrying user plane data between the UE 10 and the Internet 300. In this scenario, the gateway node 120A' may implement a Serving GPRS Support Node (SGSN) and/or Gateway GPRS Support Node (GGSN). The network node 100A' may be implemented on the basis of a common base platform 105 as illustrated in FIG. 1 and/or on the basis of multiple co-located devices. For example, a device implementing the RNC 130A and the AS platform 150A could be co-located with a further device implementing the gateway node 120A', or a device implementing the RNC 130A could be co-located with a further device implementing the gateway node 120A' and the AS platform 150A. In some implementations, also the BS 110A' could be co-located with the network node 100A', e.g., when assuming an architecture with combined BS 110A' and RNC 130A, such as in GPRS with HSPA.

In the implementation of FIG. 3, co-locating the gateway node 120A' with the RNC 130A and the AS platform 150A allows for efficiently using the gateway node 120A' as a decision point for selectively directing data traffic of the UE 10 to the AS platform 150A or to the Internet 300. Further, mechanisms of the gateway node 120A' can be utilized for applying charging, policy enforcement, and/or lawful interception also to the data traffic between the UE 10 and the AS service platform 150A.

In the implementations of FIGS. 2 and 3, the UE 10 may use an application service provided by one of the applications 161, 162, 163. The user plane data would then be routed to the AS platform 150A and to the corresponding application 161, 162, 163. This application 161, 162, 163 may in turn access the Internet 300 as needed. Through the AS platform 150A, in particular through a NIS functionality as mentioned above, the application may also obtain information on the UE 10 as available from UE context data at the BS 110A or at the RNC 130A, e.g., GUTI, RNTI, RRC State indication, serving cell RSRP or Ec/No ratio, CQI, UE transmit power, or the like. Such information will in the following also be referred to as UE context data of the access node. As used herein, the UE context data of the access node include information related to the UE which are available at the access node. The UE context data may vary from one access node to the other. The UE context data of the access node is typically radio related and may include temporary identifiers such as GUTI or RNTI. UE context data may also be available at other nodes, e.g., at the gateway nodes 120A, 120A'. UE context data of such gateway nodes is typically related to a subscription of the UE and may include permanent identifiers such as IMSI, IMEI, or MSISDN.

In addition, the application may also obtain information on the access node itself, i.e., on the BS 110A or the RNC 130A. Such information may include a number of connected UEs, an average transmit power, an average cell throughput, an average delay of buffered packets, and/or an average HS code utilization as mentioned above. Through the AS platform 150A the application may also obtain information on the UE 10 as available at the gateway node 120A/120A', e.g., IMSI, IMEI, IP address, or the like.

The concepts as illustrated in the following have the purpose of addressing situations in which an application used by the UE 10 is running on the AS platform 150A at one access node, but the UE 10 is connected to another access node, e.g., due to mobility of the UE 10.

In the architectures of FIGS. 2 and 3, the gateway node 120A/120A' would typically be assigned to the UE 10 either when the UE 10 attaches to the telecommunications network or when the UE 10 establishes a packet data network (PDN) connection, e.g., in response to a request from the UE 10. Since the decision whether to route the data traffic of the UE 10 to the AS platform or to the Internet 300 is taken at the gateway node 120A/120A', also the AS platform 150A co-located with the gateway node 120A/120A' would be selected at this point for accesses to application services provided by the applications 161, 162, 163. Although the gateway node 120A/120A' may in principle be reassigned, it is often maintained until the PDN connection is terminated. Accordingly, a situation may arise in which the application is executed at the AS platform 150A of the network node 100A/100A', but the UE 10 is connected via another BS 110A or via another RNC 130A.

In order to address such situations, the concepts as described herein involve that the AS platform at an access node, e.g., the BS 110A or the RNC 130A, which is used to provide a certain application service to a UE, obtains context data of the UE from another access node, if the UE is connected via this other access node. That is to say, the AS platform at the access node is provided with access to UE context data of a remote access node. This can be done over one or more interfaces for transferring user plane data of the UE, e.g., via an interface for transferring user plane data between the other access node and the access node, via an interface for transferring user plane data between the other access node and a gateway node co-located with the access node, or via an interface for transferring user plane data between a gateway node co-located with the other access node and a gateway node co-located with the access node. Further, the AS service platform at the access node could obtain the context data over application layer signalling, e.g., using XML (Extensible Markup Language) over HTTP (Hypertext Transfer Protocol) or the like, between an application on the AS platform at the access node and a corresponding application at the other access node. The context data may be sent by corresponding protocol messages and/or by supplementing existing protocol messages with corresponding information elements, e.g., in extension headers. Further details and implementations of this solution will be explained in the following.

Figure 4:
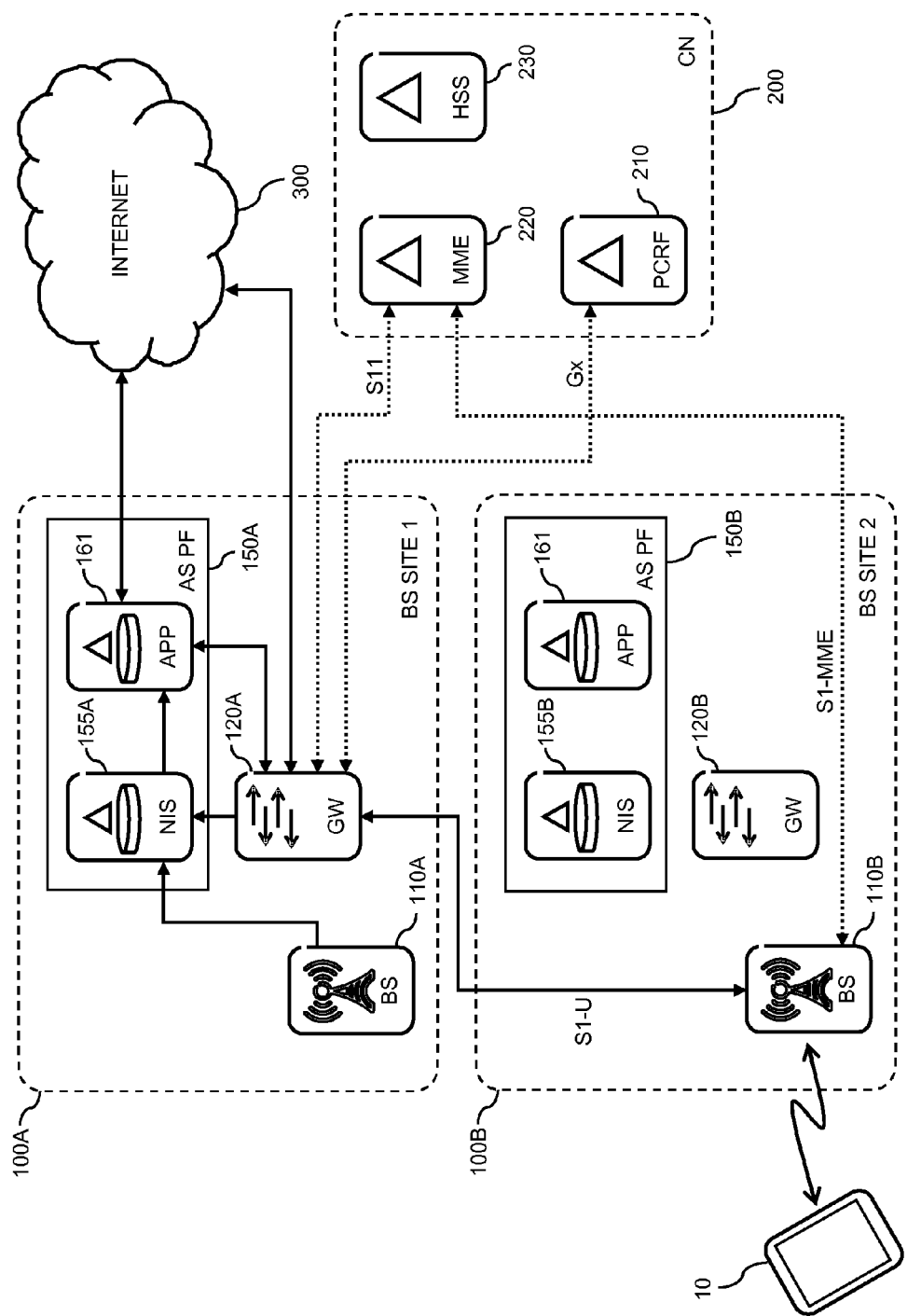
FIG. 4 schematically illustrates transfer of UE context data according to an embodiment of the invention.

FIG. 4 schematically illustrates transfer of UE context data according to an exemplary implementation. FIG. 4 illustrates the network node 100A of FIG. 2 and a further network node 100B having similar structures as the network node 100A. More specifically, the network node 100B includes a further BS 110B and an AS platform 150B. Accordingly, the AS platform 150A is provided at a site of the BS 110A (BS site 1), and the AS platform 150B is provided at a site of the further BS 110B (BS site 2). In FIG. 4 also a NIS functionality 155A of the AS platform 150A is illustrated, which has the purpose of aggregating information from the BS 110A, e.g., context data of the UE 10 while connected to the BS 110A and optionally information on the BS 110A itself, and information from the gateway node 120A so as to expose it to applications. A similar NIS functionality 155B is provided at the further AS platform 150B and has the purpose of aggregating information from the further BS 110B, e.g., context data of the UE 10 while connected to further BS 110B and optionally information on the further BS 110B itself, and information from the further gateway node 120B. The NIS functionalities 155A, 155B may be implemented as application running on the respective AS platform 150A, 150B.

In the scenario of FIG. 4, the UE 10 uses the further BS 110B for connecting to the telecommunications network. In FIG. 4, an application 161 is illustrated as being implemented on the basis of the AS platform 150A. The same application 161 may also be implemented on the basis of the AS platform 150B. In this way, the application may be hosted in a cloud like manner at different network nodes 100A, 100B. The further network node 100B also includes a further gateway node 120B. In accordance with the illustrated LTE scenario, the further gateway node 120B may implement an SGW and/or PGW. Generally, also the further gateway node 120B may be used for carrying user plane data between the UE 10 and the Internet 300. However, in the illustrated scenario it is assumed that not the further gateway node 120B, but the gateway node 120A carries user plane data between the UE 10 and the Internet 300. This situation may for example arise if a PDN connection of the UE 10 is first established when the UE 10 is connected via the BS 110A, but the UE 10 then moves to the BS 110B while maintaining the PDN connection.

Further, FIG. 4 illustrates exemplary nodes of a CN 200, namely a Policy and Charging Rules Function (PCRF) 210, a Mobility Management Entity (MME) 220, and a Home Subscriber Server (HSS) 230. From such CN nodes, control plane connections to the nodes of the RAN may be established. In the illustrated example, the PCRF 210 has a control plane connection to the gateway node 120A, via an interface referred to as Gx, and the MME has a control plane connection to the gateway node 120A, via an interface referred to as S11, and a control plane connection to the further BS 110B, via an interface referred to as S1-MME.

In the scenario of FIG. 4, user plane data of the UE 10 are conveyed via the further BS 110B and the gateway 120A using an interface, referred to as S1-U, between the further BS 110B and the gateway node 120A. At the gateway 120A, a decision is taken whether to route the user plane data to the AS platform 150A or to the Internet 300.

For providing the AS platform 150A with context data of the UE 10 as available at the further BS 110B, e.g., GUTI, RNTI, RRC State indication, serving cell RSRP or Ec/No ratio, CQI, UE transmit power, or the like, the AS platform 150A obtains such context data from the further BS 110B. This is accomplished via the S1-U interface between the further BS 110B and the gateway node 120A. For this purpose, the gateway node 120A may request the context data from the further BS 110B. For this purpose a dedicated protocol message may be used or a corresponding indication may be added to an existing protocol message of the S1-U protocol. The further BS 110B may respond to such request by providing the context data. The context data may then be provided from the gateway node 120A to the AS platform 150A, in particular to the NIS functionality 155A. In the same way, also information on the further BS 110B may be provided to the AS platform 150A. Such information may include, e.g., a number of connected UEs, an average transmit power, an average cell throughput, an average delay of buffered packets, and/or an average HS code utilization.

Figure 5:
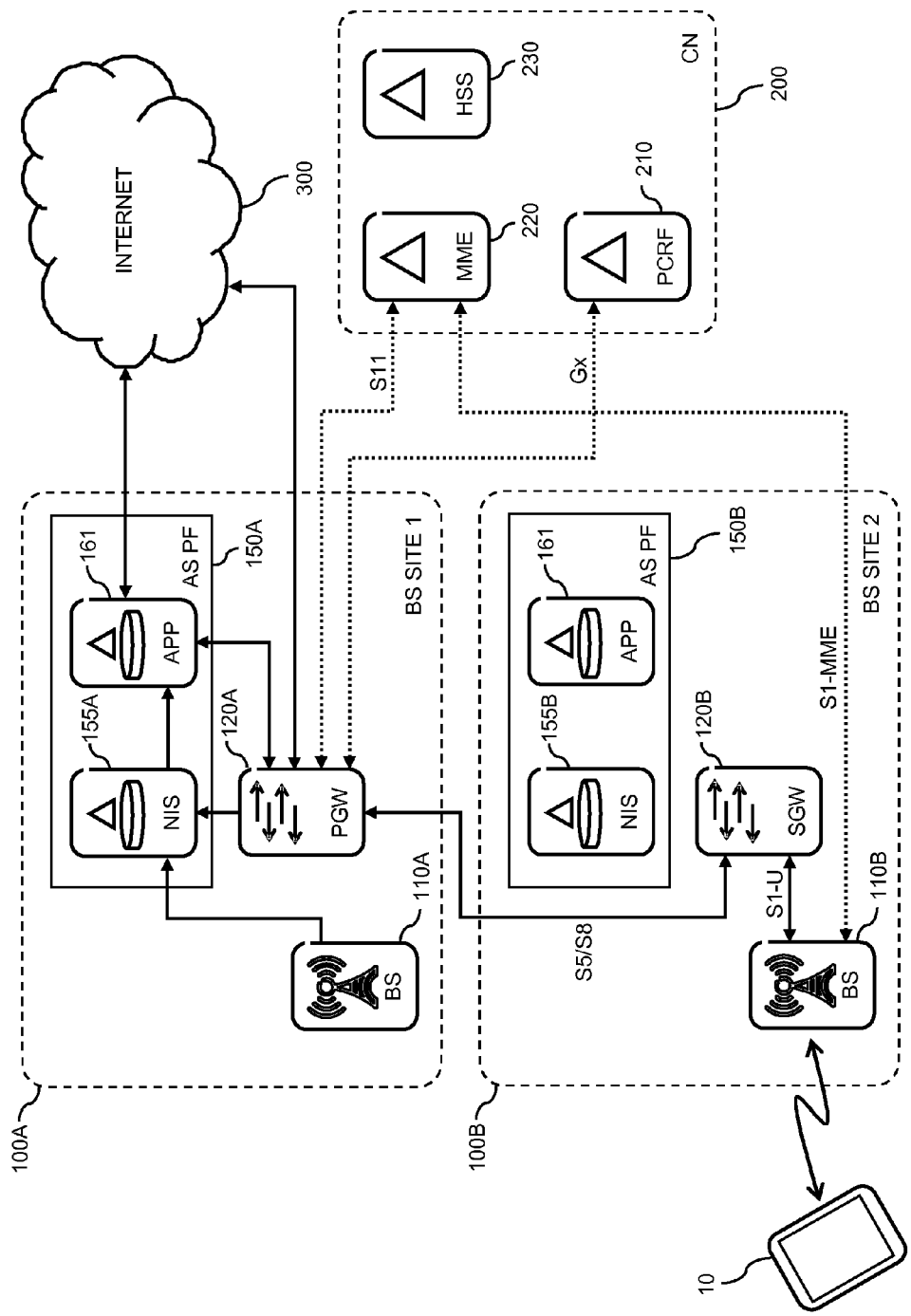
FIG. 5 schematically illustrates transfer of UE context data according to a further embodiment of the invention.

FIG. 5 schematically illustrates transfer of UE context data according to a further exemplary implementation. The structures of FIG. 5 are generally similar to that of FIG. 4. However, as compared to FIG. 4, it is assumed that the gateway node 120A of the network node 100A acts as a PGW for the UE 10, whereas the further gateway node 120B acts as a SGW for the UE 10. Accordingly, user plane data of the UE 10 are conveyed via the further BS 110B, the further gateway 120B, and the gateway 120A, using an interface between the further BS 110B and the further gateway node 120B, referred to as S1-U, and an interface between the further gateway node 120B and the gateway node 120A, referred to as S5/S8. At the gateway 120A, a decision is taken whether to route the user plane data to the AS platform 150A or to the Internet 300.

For providing the AS platform 150A with context data of the UE 10 as available at the further BS 110B, e.g., GUTI, RNTI, RRC State indication, serving cell RSRP or Ec/No ratio, CQI, UE transmit power, or the like, the AS platform 150A obtains such context data from the further BS 110B. This is accomplished via the S1-U interface between the further BS 110B and the further gateway node 120B, and via the S5/S8 interface between the further gateway node 120B and the gateway node 120A. For this purpose, the gateway node 120A may request the context data from the further gateway node 120B, and the further gateway node 120B may request the context data from the further BS 110B. For this purpose dedicated protocol messages may be used or corresponding indications may be added to an existing protocol messages of the S1-U protocol and S5/S8 protocol. The further BS 110B may respond to such request by providing the context data. The context data may then be provided from the further gateway node 120B to the gateway node 120A and then to the AS platform 150A, in particular to the NIS functionality 155A. In the same way, also information on the further BS 110B may be provided to the AS platform 150A. Such information may include, e.g., a number of connected UEs, an average transmit power, an average cell throughput, an average delay of buffered packets, and/or an average HS code utilization.

Figure 6:
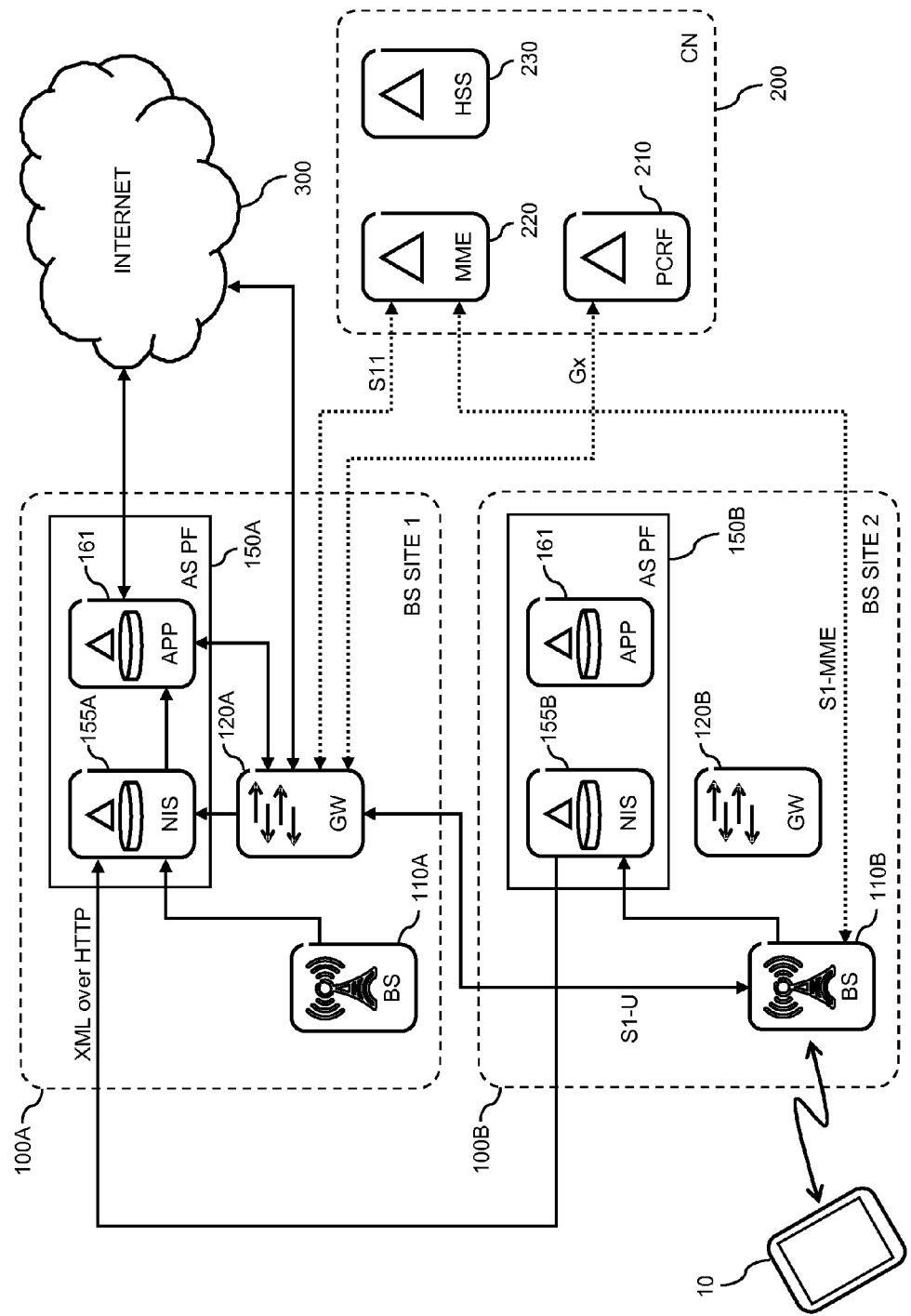
FIG. 6 schematically illustrates transfer of UE context data according to a further embodiment of the invention.

FIG. 6 schematically illustrates transfer of UE context data according to a further exemplary implementation. The structures of FIG. 6 are generally similar to that of FIG. 4. However, as compared to FIG. 4, the context data are provided to the AS platform 150A by application layer signaling between the NIS functionality 155B of the further AS platform 150B and the NIS functionality 155A of the AS platform 150A. The application layer signalling may be IP based and for example utilize XML over HTTP.

Figure 7:
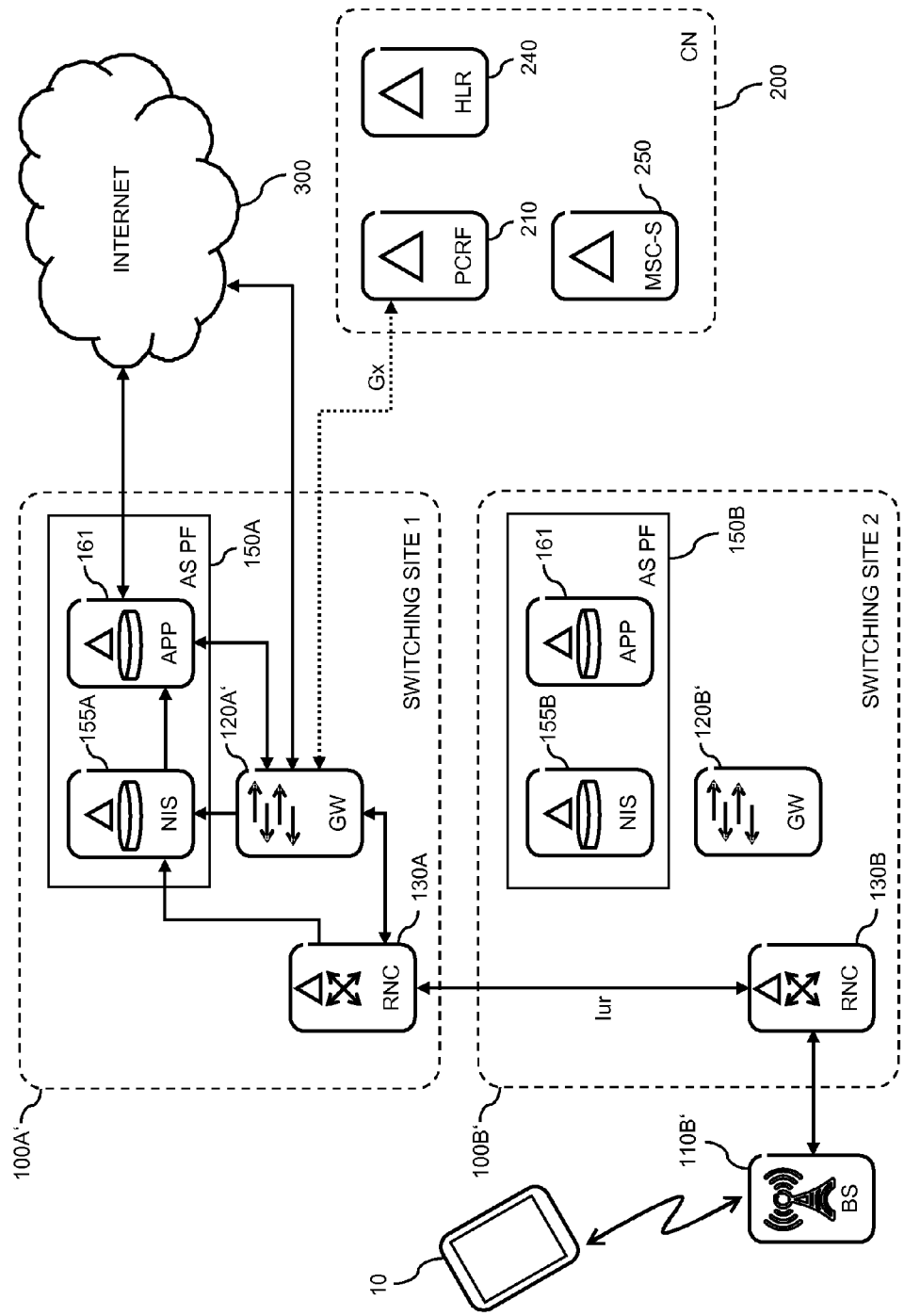
FIG. 7 schematically illustrates transfer of UE context data according to a further embodiment of the invention.

FIG. 7 schematically illustrates transfer of UE context data according to a further exemplary implementation. The scenario of FIG. 7 is based on the structure of the network node 100A' as illustrated in FIG. 3. That is to say, the AS platform 150A is co-located with the RNC 130A and the gateway node 120A'. In addition, a further network node 100B' having similar structures as the network node 100A' is illustrated. More specifically, the further network node 100B' includes a further RNC 130B connected to a further BS 110B' and a further AS platform 150B. The RNC 130A is assumed to be located at a first local switching site (switching site 1) and the further RNC 130B is assumed to be located at a second local switching site (switching site 2). In FIG. 7 also a NIS functionality 155A of the AS platform 150A is illustrated, which has the purpose of aggregating information from the RNC 130A, e.g., context data of the UE 10 while connected to the RNC 130A and optionally information on the RNC 130A itself, and information from the gateway node 120A' so as to expose it to applications. A similar NIS functionality 155B is provided at the further AS platform 150B and has the purpose of aggregating information from the further RNC 130B, e.g., context data of the UE 10 while connected to further RNC 130B and optionally information on the further RNC 130B itself, and information from the further gateway node 120B'. The NIS functionalities 155A, 155B may be implemented as application running on the respective AS platform 150A, 150B.

In the scenario of FIG. 7, the UE 10 uses the further BS 110B' and further RNC 130B for connecting to the telecommunications network. In FIG. 7, an application 161 is illustrated as being implemented on the basis of the AS platform 150A. The same application 161 may also be implemented on the basis of the AS platform 150B. In this way, the application 161 may be hosted in a cloud like manner at different network nodes 100A', 100B'. The further network node 100B' also includes a further gateway node 120B'. In accordance with the illustrated GPRS scenario, the further gateway node 120B' may implement an SGSN and GGSN. Generally, also the further gateway node 120B' may be used for carrying user plane data between the UE 10 and the Internet 300. However, in the illustrated scenario it is assumed that not the further gateway node 120B', but the gateway node 120A' carries user plane data between the UE 10 and the Internet 300. This situation may for example arise if a PDN connection of the UE 10 is first established when the UE 10 is connected via the RNC 130A, but the UE 10 then moves to the RNC 130B while maintaining the PDN connection.

Further, FIG. 7 illustrates exemplary nodes of a CN 200, namely a PCRF 210, a Mobile Switching Center Server (MSC-S) 250, and a Home Location Register (HLR) 240. From such CN nodes, control plane connections to the nodes of the RAN may be established. In the illustrated example, the PCRF 210 has a control plane connection to the gateway node 120A', via an interface referred to as Gx. In the scenario of FIG. 7, user plane data of the UE 10 are conveyed via the further BS 110B', the further RNC 130B, the RNC 130A, and the gateway node 120A' using an interface between the further RNC 130B and the RNC 130A, referred to as Iur. At the gateway node 120A', a decision is taken whether to route the user plane data to the AS platform 150A or to the Internet 300.

For providing the AS platform 150A with context data of the UE 10 as available at the further RNC 130B, e.g., GUTI, RNTI, RRC State indication, serving cell RSRP or Ec/No ratio, CQI, UE transmit power, or the like, the AS platform 150A obtains such context data from the further RNC 130B. This is accomplished via the Iur interface between the further RNC 130B and the RNC 130A. For this purpose, the RNC 130A may request the context data from the further RNC 130B. For this purpose a dedicated protocol message may be used or a corresponding indication may be added to an existing protocol message of the Iur protocol. The further RNC 130B may respond to such request by providing the context data. The context data may then be provided from the RNC 130A to the AS platform 150A, in particular to the NIS functionality 155A. In the same way, also information on the further RNC 130B may be provided to the AS platform 150A. Such information may include, e.g., a number of connected UEs, an average transmit power, an average cell throughput, an average delay of buffered packets, and/or an average HS code utilization.

Figure 8:
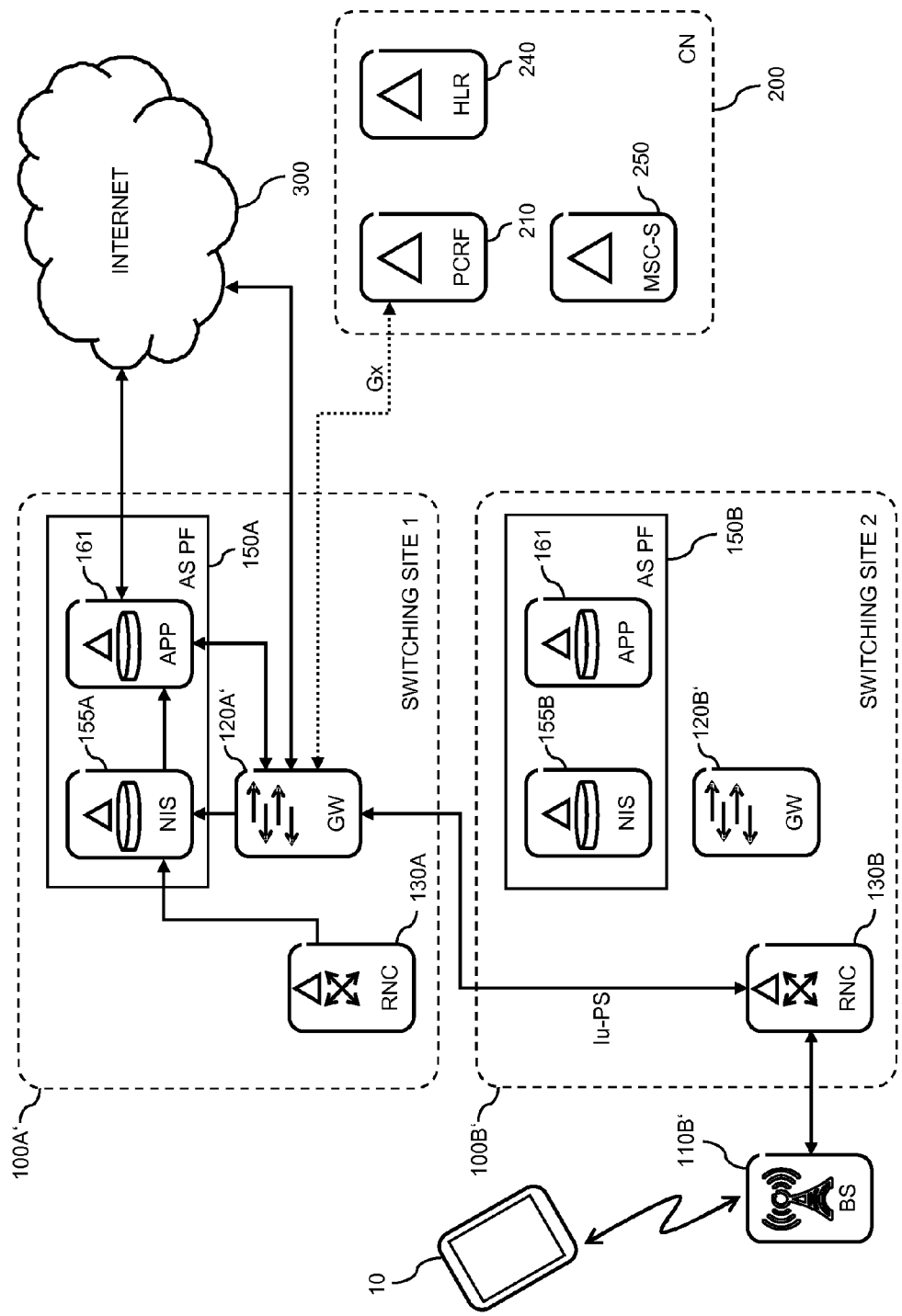
FIG. 8 schematically illustrates transfer of UE context data according to a further embodiment of the invention.

FIG. 8 schematically illustrates transfer of UE context data according to a further exemplary implementation. The structures of FIG. 8 are generally similar to that of FIG. 7. However, as compared to FIG. 7, it is assumed that initially the RNC 130A was serving the UE 10, and a RNC relocation procedure was carried out so that now the further RNC 130B is serving the UE 10 via the further BS 110B'.

In the scenario of FIG. 8 user plane data of the UE 10 are conveyed via the further BS 110B', the further RNC 130B, and the gateway node 120A using an interface between the further RNC 130B and gateway node 120A', referred to as Iu-PS. At the gateway node 120A', a decision is taken whether to route the user plane data to the AS platform 150A or to the Internet.

For providing the AS platform 150A with the context data of the UE 10 as available at the, the AS platform 150A obtains such context data from the further RNC 130B. This is accomplished via the Iu-PS interface between the further RNC 130B and the gateway node 120A'. For this purpose, the gateway node 120A' may request the context data from the further RNC 130B. For this purpose a dedicated protocol message may be used or a corresponding indication may be added to an existing protocol message of the Iu-PS protocol. The further RNC 130B may respond to such request by providing the context data. The context data may then be provided from the gateway node 120A' to the AS platform 150A, in particular to the NIS functionality 155A. In the same way, also the information on the further RNC 130B may be provided to the AS platform 150A.

It should be noted that the above examples refer to scenarios in which an AS platform is provided at both the access node 110A/130A and the further access node 110B/130B, but the AS platform at the further AS node 110B/130B is not mandatory. For example, it would also be possible to provide the further access node 110B/130B merely with support for the transfer of context data, without implementing full AS platform functionalities, e.g., by providing the NIS functionality 155B independently from an AS platform.

Figure 9:
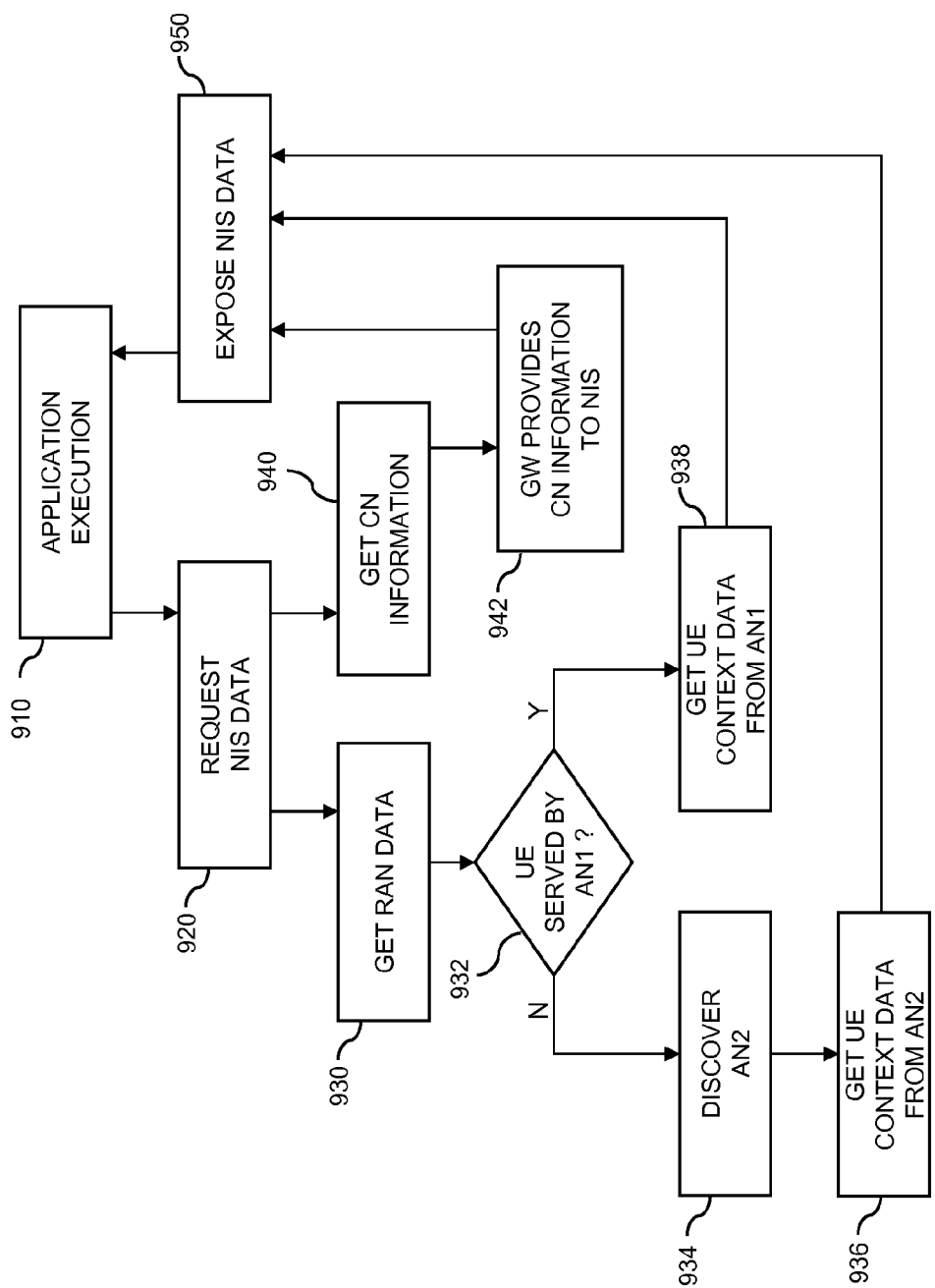
FIG. 9 shows a flowchart for schematically illustrating a method according to an embodiment of the invention.

FIG. 9 shows a flowchart for illustrating a method which may be used for providing an application service in a telecommunications network, using concepts as explained above. In this method, it is assumed that the telecommunications network is accessible to a UE, e.g., the UE 10, via an access node (AN1) or via a further access node (AN2). The access node and the further access node may correspond to BSs of the telecommunications network, e.g., to the BSs 110A, 110B in the scenarios of FIGS. 4-6. The access node and the further access node may also correspond to RNCs, e.g., to the RNCs in the scenarios of FIGS. 7 and 8. It is also assumed that an AS platform, e.g., the AS platform 150A, is provided at the access node AN1 and used for providing one or more application services to the UE. The UE can access the application service(s) via the local access node or via the remote further access node.

At step 910, an application may be executed on the AS platform so as to provide the application service. The application may be provided by an operator of the telecommunications network, the provider of the AS platform, or by some other party.

At some point, the application may need certain information on the UE or network, e.g., as provided by the above-mentioned NIS functionality. Such NIS data may for example include an identifier of the UE, e.g., an IMSI, a TMSI, a GUTI, an IMEI, or a RNTI. Further, such NIS data may include radio channel information such as a RRC State indication, a serving cell RSRP or Ec/No ratio measured by the UE, a CQI determined by the UE, a transmit power of the UE, or the like. This information may also include information about the access node utilized by the UE, e.g., a number of connected UEs, an average transmit power, an average cell throughput, an average delay of buffered packets, and/or an average HS code utilization.

At step 920, the AS platform requests the NIS information. This may involve sending a request each time NIS data are needed or performing a subscription so as to repeatedly receive the NIS data, e.g., at regular time intervals or if there are changes in the NIS data.

The NIS data may include RAN information as typically available from the access node via which the UE is connected and CN information as typically available from a gateway node via which the UE is connected. The RAN information may include the GUTI, RNTI, RRC state indication, serving cell RSRP, Ec/No ratio, transmit powers, average transmit powers, CQI, cell throughput, or the like. The CN information may include the IMSI, IMEI, MSISDN, UE IP address, or the like.

At step 930, the AS platform may start a procedure for obtaining the RAN information. For taking into account that the UE may be connected to the telecommunications network via the further access node, the AS platform may first check if the UE is connected to the access node which is co-located with the AS platform, as illustrated by step 932. For this purpose, it can be checked if the access node at the AS platform currently is the serving access node of the UE.

The check of step 932 may be performed on the basis of an identifier of the UE as available at the AS platform. More specifically, such probe function may use the identifier of the UE to query the local access node at the AS platform whether the UE is connected to this access node. In response to such query, the access node may check its UE context data and provide a response indicating whether the UE is served by the local access node or not. If the UE is not served by the local access node, as indicated by branch "N", the method may continue with step 934. If the UE is served by the local access node, as indicated by branch "Y", the method may continue with step 938. The check of step 932 may be implemented as a part of the NIS functionality of the AS platform or may be implemented as an application running on the AS platform.

At step 934, the AS platform may discover the further access node via which the UE is connected to the telecommunications network. This may in particular involve obtaining a network address of the further access node.

Such discovery function may for example be based on information related to the above-mentioned S1-U interface or Iu-PS interface and utilize information from a tunnel protocol used on these interfaces, referred to as user plane GPRS Tunnelling Protocol (GTP-U). Such tunnel protocol information may be held in a gateway node co-located with the AS platform, e.g., a GGSN or SGW/PGW. The discovery function may query the destination IP address for the GTP-U tunnel of the UE from the gateway node. In this process, an identifier of the UE as known in the gateway node, e.g., IMSI or MSISDN, may be used for identifying the UE. The local gateway node may then return the IP address of the access node currently serving the UE.

A further possibility of for implementing the discovery function would be to send a reverse Domain Name System (DNS) query for the destination IP address for the GTP-U tunnel as described above to get a Fully Qualified Domain Name (FQDN) for the remote access node, insert a text string like "AS-platform" before the FQDN, and then perform still another DNS query to get an IP address for a specific IP interface of the access node currently serving the UE.

The discovery function of step 934 may be implemented as a part of the NIS functionality of the AS platform or may be implemented as an application running on the AS platform.

At step 936, the AS platform may obtain the RAN information from UE context data of the remote access node. For this purpose, various transport mechanisms may be used.

In some implementations, the RAN information may be transferred by using existing interfaces for transferring user plane data between the remote access node and a gateway node co-located with the AS platform. For this purpose, the RAN information may be packetized and sent to the AS platform. Interfaces which may be used for this purpose are the S1-U, S5/S8, Iur, and Iu-PS interfaces as explained in connection with FIGS. 4, 5, 7, and 8. GTP-U interface for the UE. The RAN information can be included in the user plane data packets of the GTP-U protocol used on these interfaces. Dedicated protocol messages may be defined for this purpose or existing protocol messages may be supplemented by corresponding information elements.

In other implementations, application layer signalling may be used for transferring the RAN information from the remote access node to the AS platform. This may for example be accomplished by the NIS functionalities or similar application at the different access nodes, as illustrated in FIG. 6. The RAN information may be collected and packetized by the application at the remote access node and sent to the application at the local access node. For this purpose various types of IP based transport mechanisms could be used, e.g., XML over HTTP. For such transport mechanisms, the network address as discovered in step 934 may be used.

At step 938, the AS platform may obtain the RAN information from UE context data of the local access node. For this purpose, dedicated interfaces may be established between the local access node and the AS platform.

At step 940, the AS platform may start a procedure for obtaining the CN information. The CN information may be requested from a gateway node which is co-located with the access node, e.g., as explained for the gateway nodes 120A, 120A' of FIGS. 4-8. At step 942, the local gateway node may provide the CN information to the AS platform.

At step 950, the AS platform may expose the NIS data, including the RAN information and the CN information, to the applications running on the AS platform, thereby enabling application service to utilize the NIS data.

As can be seen, if the UE is connected to the telecommunications network via the further access node, the AS platform at the access node obtains the context data of the UE from the further access node. If the UE is connected to the telecommunications network via the further access node, the AS platform at the access node obtains the context data of the UE from the access node.

Figure 10:
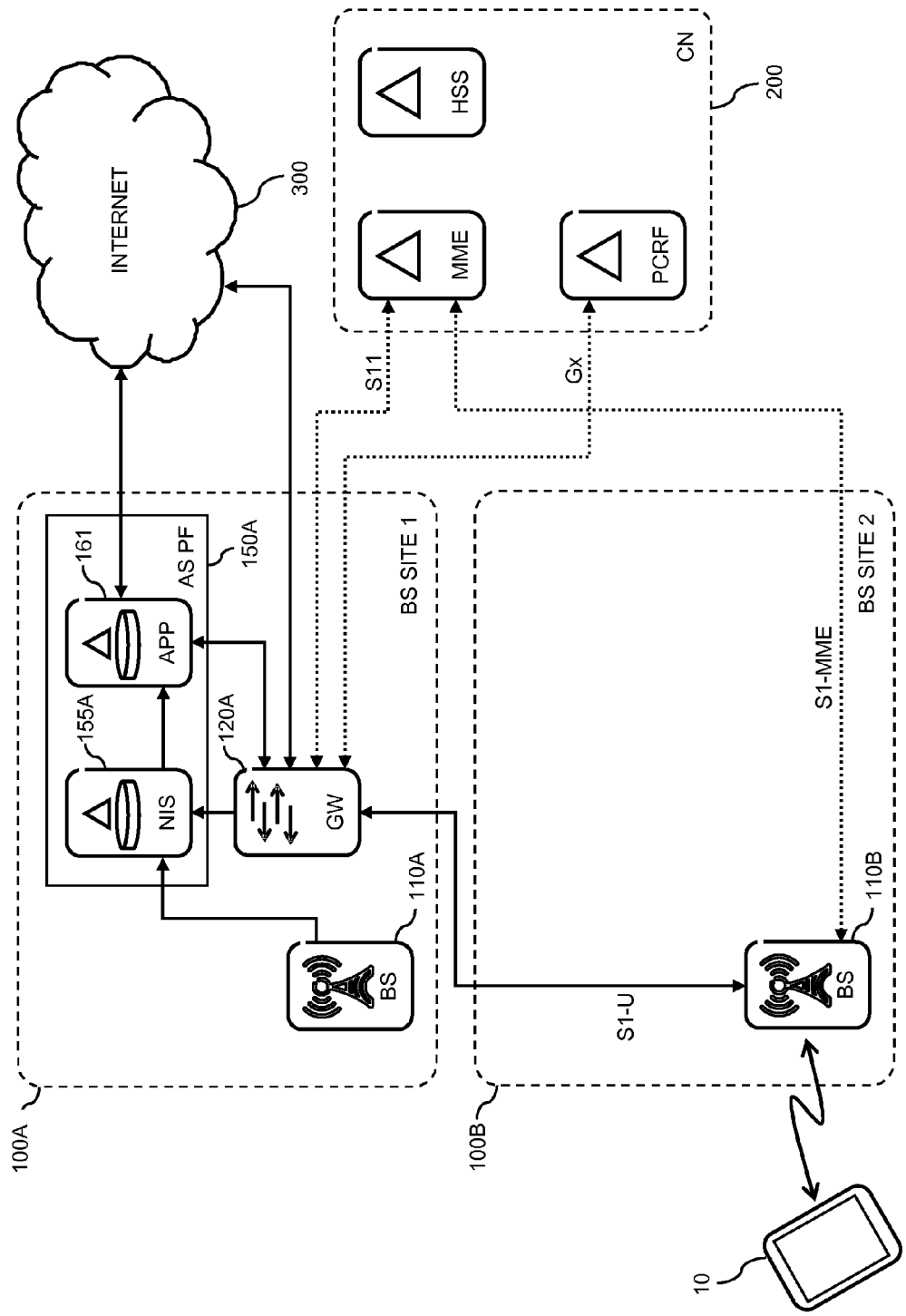
FIG. 10 schematically illustrates a scenario in which a UE is connected via a legacy access node without support for transfer of UE context data.

In some scenarios, it may also happen that UE moves to a legacy access node which does not support the above-described provision of UE context data, e.g., because no AS platform is provided at the remote access node. An example of such a scenario is illustrated in FIG. 10. The structures of FIG. 10 are generally similar to that of FIG. 4. However, in this case the network node 100B is not equipped with the AS platform 150B and functionalities for providing UE context data from the BS 110B to the AS platform 150A.

In scenarios as illustrated in FIG. 10, it may occur that the remote access node, e.g., the further BS 110B of FIG. 10, receives a request for the UE context data, e.g., via an interface for transferring user plane data such as the S1-U interface illustrated in FIG. 10. In order to allow interworking with the legacy access node, the protocol used for obtaining the UE context data from the remote access node may be designed in such a way that the legacy access node disregards such request and takes no further action. At the network node 100A, the possibility of requests being disregarded may be taken into account by implementing a timer functionality. For example, if in a given time period after sending the request the UE context data are not received by the AS platform 150A, the AS platform 150A could determine that the remote access node is a legacy access node which does not support the provision of UE context data.

In scenarios where application layer signaling is used for transferring the UE context data from the remote access node, the protocol used for obtaining the UE context data from the remote access node may be designed in such a way that the legacy access node disregards such application layer signalling and takes no further action. Further, attempts to discover the network address of the legacy access node may result in no IP address or FQDN being returned or return the "localhost" IP address (e.g., 127.0.0.1). Such failed attempts to discover the network address can be interpreted by the AS platform 150A as an indication that the remote access node is a legacy access node which does not support the provision of UE context data. The possibility of the application layer being disregarded may again be taken into account by implementing a timer functionality.

As can be seen, the concepts as described above may be used for efficiently providing a local AS platform at an access node with various information related to a UE, even if another access node is used for connecting the UE to the telecommunications network.

It is to be understood that the examples and embodiments as explained above are merely illustrative and susceptible to various modifications. For example, the concepts could be used in connection with various types of telecommunications networks, e.g., implementing other types of radio access technologies. Also, it is to be understood that various types of access technology could be combined in the same telecommunications network, e.g., LTE access nodes and UMTS/GPRS access nodes as mentioned above.

Also, various examples described above are based on "pull" procedures in which it is locally detected that the UE is being served by a remote access node information is then requested from the remote access node. Alternatively or in addition, also "push" procedures could be used in which the remote access node discovers the AS platform and provides it with the information available at the remote access node, e.g., in response to an received subscription. The subscription could also be used for obtaining a network address of the AS platform.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or server farm.

The invention claimed is:

1. A method of providing an application service in a telecommunications network which is accessible to a user equipment via an access node or via a further access node, the method comprising:
   providing an application service platform at the access node, wherein the access node is a base station or a Radio Network Controller;
   via the application service platform at the access node, providing one or more application services that are accessible to the user equipment via the access node or the further access node;
   if the user equipment is connected to the telecommunications network via the further access node, obtaining, at the application service platform at the access node, context data of the user equipment from the further access node.

2. The method of claim 1, wherein the application service platform at the access node obtains the context data over at least one interface for transferring user plane data between the user equipment and the telecommunications network.

3. The method of claim 2, wherein the application service platform at the access node obtains the context data via an interface for transferring user plane data between the further access node and the access node.

4. The method of claim 2, wherein the access node is co-located with a gateway node, and wherein the application service platform at the access node obtains the context data via an interface for transferring user plane data between the further access node and the gateway node.

5. The method of claim 2, wherein the access node is co-located with a gateway node and the further access node is co-located with a further gateway node, and wherein the application service platform at the access node obtains the context data via an interface for transferring user plane data between the further gateway node and the gateway node.

6. The method of claim 1, wherein the application service platform at the access node obtains the context data via application layer signalling between an application on the application services platform at the access node and an application on an application services platform at the further access node.

7. The method of claim 1, further comprising identifying that the user equipment is connected to the further access node.

8. The method of claim 7, wherein said identifying is based on an identifier of the user equipment available at the application service platform at the access node.

9. The method of claim 7, further comprising obtaining, at the application platform at the access node, a network address of the further access node.

10. The method of claim 1, wherein obtaining the context data comprises sending a request to the further access node.

11. The method of claim 10, wherein obtaining the context data comprises receiving the context data in response to the request.

12. The method of claim 1, wherein the application service platform at the access node obtains the context data together with information on the further access node.

13. A network node, comprising:
an access node configured to provide access of a user equipment to a telecommunications network, wherein the access node is a base station or a Radio Network Controller; and
an application service platform configured to support one or more application services that are accessible to the user equipment via the access node or via a further access node of the telecommunications network, wherein the application service platform is configured to obtain, if the user equipment is connected to the telecommunications network via the further access node, context data of the user equipment from the further access node.

14. The network node of claim 13, further comprising a gateway node for carrying user plane data of the user equipment.

15. A network system, comprising:
an access node and a further access node configured to provide access of a user equipment to a telecommunications network, wherein the access node is a base station or a Radio Network Controller; and
an application service platform at the access node configured to support one or more application services that are accessible to the user equipment via the access node or via the further access node, wherein the application service platform at the access node is configured to obtain, if the user equipment is connected to the telecommunications network via the further access node, context data of the user equipment from the further access node; and
wherein the further access node is configured to provide the context data to the application service platform at the access node.

16. The network system of claim 15, further comprising an application service platform at the further access node, the application service platform at the further access node being configured to provide the context data to the application service platform at the access node.

17. The network system of claim 15, further comprising a gateway node at the access node for carrying user plane data of the user equipment.

* * * * *